Patented June 5, 1923.

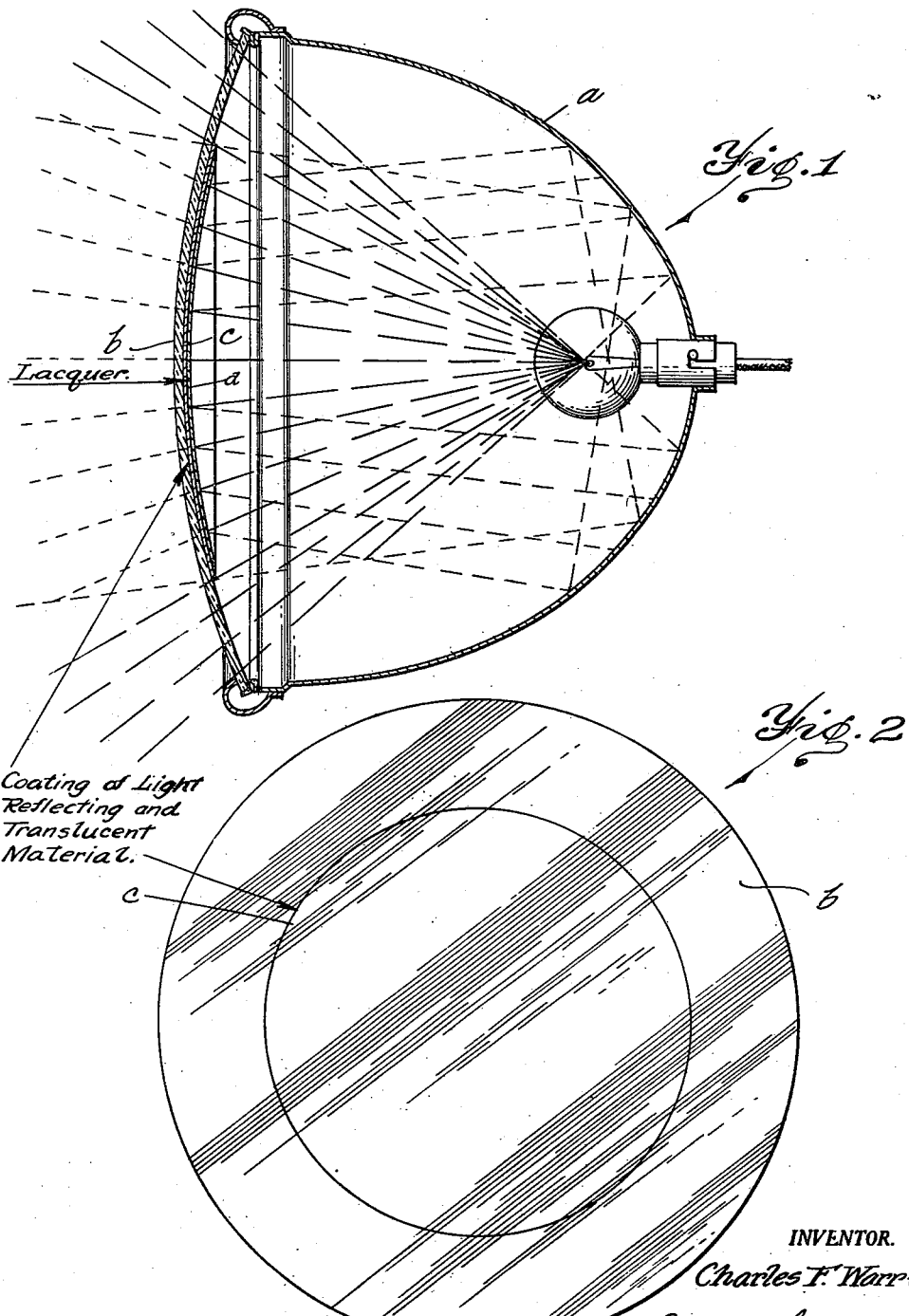

1,457,565

UNITED STATES PATENT OFFICE.

CHARLES F. WARRICK, OF DETROIT, MICHIGAN.

HEADLIGHT LENS.

Application filed October 1, 1921. Serial No. 504,734.

*To all whom it may concern:*

Be it known that I, CHARLES F. WARRICK, a citizen of the United States, residing at Detroit, in the county of Wayne and State of Michigan, have invented certain new and useful Improvements in Headlight Lenses, of which the following is a specification.

This invention relates to headlights using glare reducers or dimmers. It has for its object a dimmer or glare reducer which has the function of letting some of the rays of light pass through the lens, and the additional function of reflecting back into the reflector those rays which do not pass through the lens the first time. Part of the rays that are thus thrown back into the reflector find their way out at the sides of the combined dimmer and reflector, while the other rays are given another opportunity to pass through the dimming portion of the lens, as will more thoroughly be explained hereinafter.

In the drawings,—

Fig. 1 is a vertical cross section of an automobile headlight showing the lens equipped with my combined dimmer and reflector.

Fig. 2 is a plan view of the lens so equipped.

*a* designates a headlight which for convenience of illustration is shown as provided with a single shell which acts both as the casing and the reflecting surface. *b* designates the lens which is coated with a deposit of silver or other metal so thin as to be translucent to ordinary light. This deposit is designated *c*. This coating is on the inside of the lens and is protected by a thin layer of translucent lacquer *d* or other suitable material. The coating does not reach the edges of the lens but is spaced quite a distance from the edge of the lens, as will be apparent from Fig. 2. This silver or metallic coating on the lens accords with the color of the reflector to give the appearance of one solid mass of silver or other metal for the headlight in the day time. This is pleasing to the eye.

At night when the headlight is in use the rays of light radiate out from the incandescent filament somewhat in the fashion shown by the lines in Fig. 1. It is a well known fact that light is made up of various characters of rays which are given technical names. These rays are of varying frequency and wave lengths. Some rays are capable of passing through some substances while others are not. The coating of silver or other metal on the back of the lens is relatively thin. This coating is so thin that it will be impractical to specifiy in terms of measurement the exact thickness of my coating. Suffice it to say that in the preferred form I employ a silver or other metallic coating which is so relatively thin that when held up to the light it is possible to see through it with about the same clearness of vision as is obtained with colored glass goggles. On the other hand, when the lens is held away from the light, as towards the floor, it is not possible to see through the lens very clearly but the lens constitutes a very good mirror or reflector. Any one skilled in making mirrors or applying silver or other metallic preparations to glass can readily achieve these results by a slight amount of experimentation.

In Fig. 1 it will be seen that some of the rays are shown going through the lens. These are the rays of a character which will penetrate the silver coating. The consequence is that the light passing through the silver coating is very much subdued or dimmed and consequently is not at all objectionable to one standing in front of it. I call this part of the lens translucent because it has the property of letting some light through. The other rays of light that fail to pass through the coating are reflected back upon the reflector and thence reflected one or more times before they find their way finally out of the lens either through the uncoated part of the lens near the rim or through the coated portion. After being reflected back and forth several times in this way these rays are not of such a character as to give an objectionable glare when they finally issue out of the lens.

The great point with my invention is that, instead of the rays of light being lost by absorption in the dimmer, the rays are not absorbed but simply subdued and practically all of them find their way out of the lens, thus increasing the efficiency of the headlight as contradistinguished from the headlight with the ordinary type of dimmer.

I speak of coating the back of the lens with silver or other metallic material. Of course it will be understood that the other metallic material will have to be bright and have reflective properties in order to carry out the idea involved in my invention. When I speak of the color of the reflective coating according with the reflector I mean that it is advantageous to use a silver deposit where the reflector is provided with a silver coating, and where, for instance, the reflector is provided with some other coating of material such as brass or copper it is then desirable to have the coating on the back of the lens in the form of a coating of brass or copper.

What I claim is:

1. A headlight, having in combination, a reflector, a source of light in front of the reflector, and a lens in front of the source of light, comprising a glass, having a central portion coated on the inside with a metal deposit so thin as to have both reflective and transparent properties, and a clear transparent unobstructed rim portion surrounding said coated portion, the arrangement of the coated and transparent portions being such that reflected rays from the metal coating find their way out of the transparent portion of the lens after having been reflected by the said reflector.

2. A headlight, having in combination, a reflector, a source of light in front of the reflector, and a lens, having a full-moon central portion coated with a metal deposit so thin as to have both reflective and transparent properties, positioned concentric with respect to the perimeter of said lens, and a transparent and unobstructed ring portion surrounding said full-moon coated central portion, so that the reflected rays from the metal coating find their way out of the transparent portion of the lens after having been reflected by the said reflector.

In testimony whereof I affix my signature.

CHARLES F. WARRICK.